(12) United States Patent
Dharmarajan et al.

(10) Patent No.: US 12,081,524 B2
(45) Date of Patent: Sep. 3, 2024

(54) GLOBALLY AVAILABLE VPN AS A SERVICE

(71) Applicant: Microsoft Technology Licensing, LLC, Redmond, WA (US)

(72) Inventors: Shyamshankar Dharmarajan, Redmond, WA (US); Sumit Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 17/842,663

(22) Filed: Jun. 16, 2022

(65) Prior Publication Data
US 2023/0412567 A1    Dec. 21, 2023

(51) Int. Cl.
*H04L 67/10* (2022.01)
*H04L 9/40* (2022.01)
*H04L 61/4511* (2022.01)

(52) U.S. Cl.
CPC ...... *H04L 63/0272* (2013.01); *H04L 61/4511* (2022.05); *H04L 63/029* (2013.01); *H04L 67/10* (2013.01)

(58) Field of Classification Search
None
See application file for complete search history.

(56) References Cited

U.S. PATENT DOCUMENTS

| 6,154,777 A | 11/2000 | Ebrahim | |
| 2017/0171158 A1* | 6/2017 | Hoy | H04L 63/1408 |
| 2019/0334864 A1* | 10/2019 | Yin | H04L 63/0272 |
| 2021/0409496 A1 | 12/2021 | Quinn et al. | |

OTHER PUBLICATIONS

"BIG-IP Solutions Guide v4.2: Load Balancing IPSEC Traffic", Retrieved From: https://techdocs.f5.com/kb/en-us/archived_products/big-ip/manuals/product/bag42/BIGip_IPSEC.html, Retrieved On: Mar. 4, 2022, 5 Pages.
Garbers, Annika, et al., "Announcing Anycast IPsec: a new on-ramp to Cloudflare One", Retrieved From: https://blog.cloudflare.com/anycast-ipsec/, Dec. 6, 2021, 7 Pages.
"International Search Report and Written Opinion Issued in PCT Application No. PCT/US2023/022306", Mailed Date: Jul. 11, 2023, 10 Pages.
Richardson, M., "A Method for Storing IPsec Keying Material in DNS", In Proceedings of Request for Comments, vol. 4025, Feb. 1, 2005, 12 Pages.

* cited by examiner

*Primary Examiner* — Cai Y Chen
(74) *Attorney, Agent, or Firm* — Schwegman Lundberg & Woessner, P.A.

(57) ABSTRACT

Generally discussed herein are devices, systems, and methods for globally accessible virtual private network (VPN) as a service. A method can include receiving a domain name request at a domain name system (DNS), the domain name request being received from a tenant premise equipment and including a domain name of a plurality of domain names associated with a VPN service, identifying, by the DNS and based on the domain name, an Internet Protocol (IP) address of a node of nodes dedicated to servicing traffic of the domain name, and establishing, by the DNS, a VPN tunnel between the tenant premise equipment and the identified node.

20 Claims, 7 Drawing Sheets

| DOMAIN NAME | IP ADDRESS | HEALTH | CAPACITY | REGION |
|---|---|---|---|---|
| VPN 1 | IP 1 | HEALTH 1 | CAPACITY 1 | REGION 1 |
| VPN 1 | IP 2 | HEALTH 2 | CAPACITY 2 | REGION 1 |
| VPN 1 | IP 3 | HEALTH 3 | CAPACITY 3 | REGION 1 |
| VPN 1 | IP 4 | HEALTH 4 | CAPACITY 4 | REGION 1 |
| VPN 2 | IP 5 | HEALTH 5 | CAPACITY 5 | REGION 1 |
| ... | ... | ... | ... | ... |
| VPN N | IP 39 | HEALTH 39 | CAPACITY 39 | REGION 2 |
| VPN N | IP 40 | HEALTH 40 | CAPACITY 40 | REGION 2 |

*FIG. 3*

GLOBALLY AVAILABLE VPN AS A SERVICE

BACKGROUND

Cloud virtual private network (VPN) services are static. Using these cloud VPNs, users create tunnels from Customer Premise Equipment (CPE) at a branch office to the cloud service using a technology like Internet Protocol (IP) Security (IPSec). The tunnels are usually fixed bandwidth tunnels with the max bandwidth of the tunnel is capped by what the cloud service can support for a single tunnel. If the user needs more bandwidth, they create multiple tunnels. IPSec tunnels are defined by a unique<source IP, destination IP>pair. Thus, to create multiple such tunnels, the CPE uses a unique source IP address and a same destination IP for each tunnel.

SUMMARY

A device, system, method, and computer-readable medium configured for virtual private network (VPN) available as a scalable, globally available service. The VPN can be supported by multiple nodes such that each node (or group of nodes) is accessible through a different domain name. Such a configuration allows CPE to use a single source IP address and access multiple destination IP addresses that resolve to a tunnel of the VPN service simultaneously. Other advantages and innovations are described.

A method for VPN as a service can include receiving a domain name request at a domain name system (DNS). The domain name request can be received from a CPE and include a domain name of a plurality of domain names associated with a VPN service. The method can include identifying, by the DNS and based on the domain name, an Internet Protocol (IP) address of a node of nodes dedicated to servicing traffic of the domain name. The method can further include establishing, by the DNS, a VPN tunnel between the tenant premise equipment and the identified node.

The nodes can be a subset of a plurality of nodes. The plurality of nodes can be organized into groups of nodes dedicated to servicing traffic of a respective domain name of the plurality of domain names. The method can further include scheduling maintenance of the plurality of nodes such that groups of nodes are sequentially scheduled for maintenance. Scheduling maintenance can be accomplished such that only a single group undergoes maintenance at a given time.

The groups can include nodes in multiple geographically separated regions. The method can include determining which of the geographically separated regions is closest to the CPE. Identifying the node can include selecting a node of the plurality of nodes assigned to the group and in the region geographically closest to the CPE.

The method can include, before establishing the VPN tunnel with the identified node, determining whether the identified node has sufficient health to service the traffic. The method can include establishing the VPN tunnel responsive to determining the identified node has sufficient health. Determining whether the identified node has sufficient health includes issuing a monitor packet to the node and receiving an acknowledgment packet, a negative acknowledgment, or no response to the monitor packet. The method can further include determining the node has sufficient health responsive to the acknowledgement packet and determining the node has insufficient health otherwise.

The method can further include, before establishing the VPN tunnel with the identified node, determining whether the identified node has sufficient capacity to service the traffic. The method can further include establishing the VPN tunnel responsive to determining the identified node has sufficient capacity. Determining whether the identified node has sufficient capacity can include issuing a monitor packet to the node and receiving an acknowledgment packet, a negative acknowledgment, or no response to the monitor packet. The method can further include determining the node has sufficient capacity responsive to the acknowledgement packet and determining the node has insufficient capacity otherwise.

The method can further include receiving a request to subscribe to more tunnels than are required to satisfy a bandwidth requirement of a tenant. The method can further include subscribing a tenant to the tunnels based on the request. The method can further include satisfying the bandwidth requirement even when a group of nodes dedicated to servicing a tunnel of the tunnels is down for maintenance. The method can further include detecting the established VPN tunnel has failed. The method can further include responsive to detecting the established VPN tunnel has failed, establishing a second VPN tunnel between the tenant premise equipment and a second node of the plurality of nodes with a different IP address.

BRIEF DESCRIPTION OF DRAWINGS

FIG. 3 illustrates, by way of example, a diagram of an embodiment of a DNS memory to support VPN as a service.

DETAILED DESCRIPTION

Figure 1:
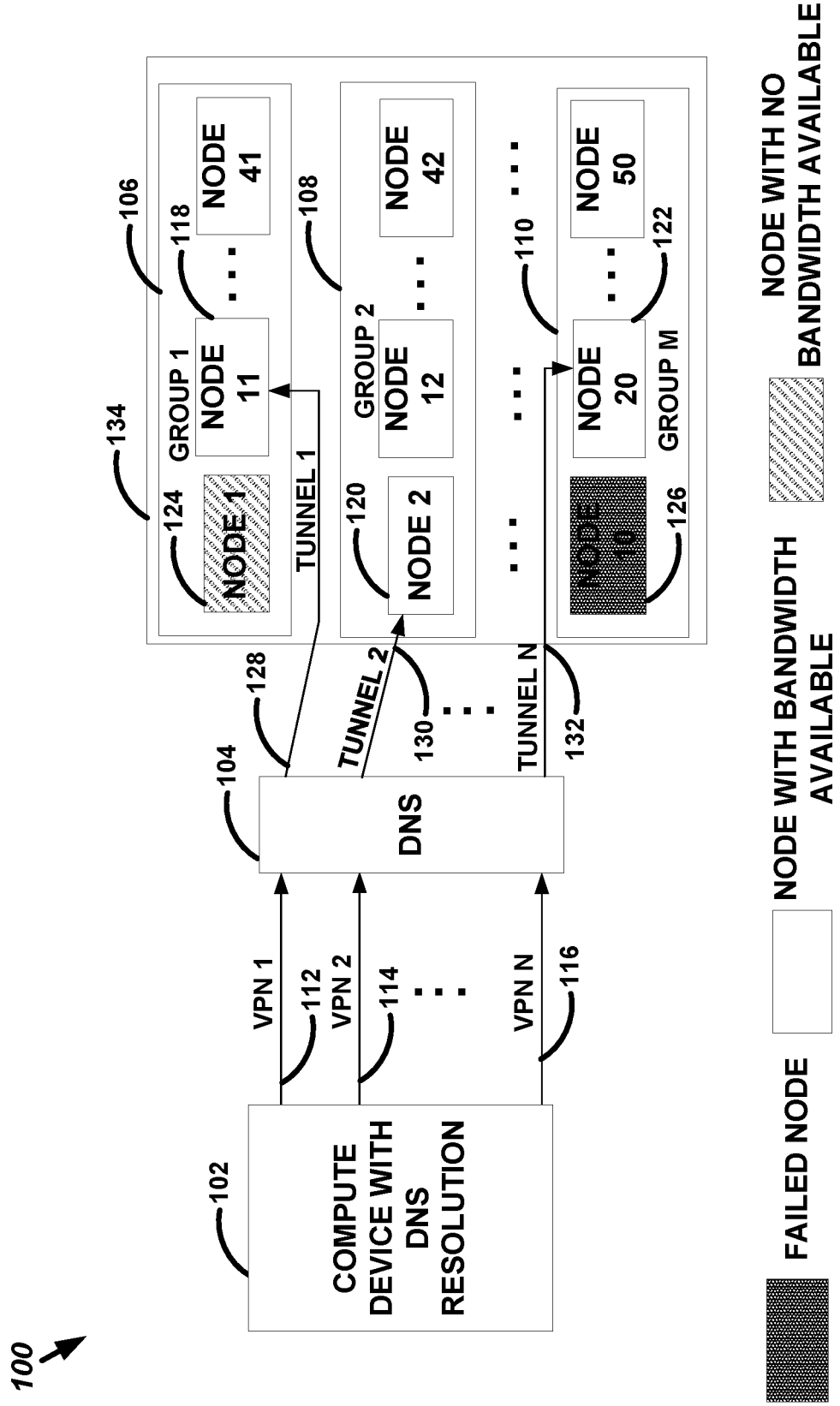
FIG. 1 illustrates, by way of example, a block diagram of an embodiment of a system for a multi-tenant virtual private network (VPN) as a service.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

A VPN system, by including a DNS to resolve to a VPN server, provides a dynamic multi-tenant service where a compute device can use a single source IP address to create multiple VPN tunnels as needed. This is achieved by a VPN service exposing, via the DNS 104, multiple domain names to the compute device. The compute device creates different VPN tunnels through respective domain names. Each domain name can be guaranteed to return a different IP address (a different destination IP address).

A VPN provides internet security and anonymity for internet traffic. Embodiments regard a VPN as a service that operates more transparent to a tenant and with less alterations to the equipment of a tenant than prior VPN solutions. Embodiments make it easier to provide a specified bandwidth even while system maintenance is being performed. Instead of having multiple source internet protocol (IP) addresses that tunnel to a same destination IP address, embodiments leverage a domain name system (DNS) that resolves to a VPN service that supports multiple domain names. The DNS can resolve the domain name to an IP address of a group of IP addresses having associated compute nodes that are dedicated to serving traffic to that domain name. The DNS can further help improve the VPN service. Performance can be improved by ensuring that a node to which the domain name resolves has sufficient capacity, is healthy (e.g., is not associated with an error, is online, etc.), or the like prior to resolving the domain name to the IP address of the node. Further, VPN as a service can be improved by organizing nodes to which the domain names resolve can be organized into groups of nodes. The nodes of a given group can be selected such that the nodes of the group provide multiple IP addresses to which a given domain name resolves and the nodes are updated and maintained together in a so-called "update group". By organizing groups of nodes by "update group" the VPN service can ensure that only one group of all the groups of nodes is being updated or maintained at a given time. A tenant can anticipate that one tunnel to which they are subscribed will be down for updates or maintenance and subscribe to more domain names than they need to achieve their desired bandwidth. Thus, when a group is not available due to updates or maintenance the tenant can still achieve their desired bandwidth.

Reference will now be made to the FIGS. to describe further details of embodiments. The FIG. 1 illustrate examples of embodiments and one or more components of one embodiment can be used with, or in place of, a component of a different embodiment.

FIG. 1 illustrates, by way of example, a block diagram of an embodiment of a system 100 for a multi-tenant virtual private network (VPN) service. The system 100 as illustrated includes a compute device 102, a domain name system 104, and groups 106, 108, 110 of compute nodes 118, 120, 122, 124, 126. The compute device 102 can include a laptop computer, smartphone, desktop computer, smart appliance, smart car, channel service unit, data service unit, router, wireless access point, modem, cable box, network service adapter, or other local area network (LAN) or wide area network (WAN) device capable of connecting to the internet. The compute device 102, in the context of some VPN technologies, is sometimes called Customer Premises Equipment (CPE). CPE is telecommunications and information technology equipment that is private to a tenant as opposed to on site of a VPN service provider.

The compute device 102 can establishes multiple tunnels 128, 130, 132 through a domain name system 104. Each of the domain names 112, 114, 116 is unique. The domain names 112, 114, 116 hide the IP address of the node 118, 120, 122, 124, 126. The domain name 112, 114, 116 allows the VPN functionality to be exposed as a service rather than a point-to-point connection.

The DNS 104 is a sort of phonebook for the Internet. Users access websites and other Internet resources through domain names that have an extension such as ".com", ".net", ".org", or the like. Web browsers and other Internet interaction tools understand and respond to IP addresses. The DNS 104 translates domain names to IP addresses so that Internet resources can be loaded on the compute device 102. Typically, each compute device 102 has a unique IP address which other machines use to find the device. DNS 104 can include a resolver, root nameserver, top level domain (TLD) server, and authoritative nameserver operations.

An example DNS 104 operation includes a user typing "example.com" into a web browser of device 102 and a corresponding query travels into the Internet and is received by the DNS 104. The resolver then queries a DNS root nameserver (.). The DNS root nameserver then responds to the resolver with the address of the TLD server (such as .com or .net), which stores the information for its domains. When searching for example.com, the query is pointed toward the .com TLD. The resolver then makes a request to the .com TLD. A TLD server then responds with the IP address of the nameserver of the domain, example.com. Lastly, the recursive resolver sends a query to the domain's nameserver. The IP address for example.com is then returned to the resolver from the nameserver. The DNS resolver then responds to the web browser with the IP address of the domain requested. The IP address is then used by the compute device 102 to connect to the server that hosts the IP address.

In the instance of VPN, the DNS 104 provides an IP address of a compute node 118, 120, 122, 124, 126 that will operate on traffic from the compute device 102. Each of the nodes 118, 120, 122, 124, 126 can be different cores, processing units, compute devices, virtual machines, or the like. The DNS 104 provides a tunnel 128, 130, 132 between one or more of the nodes 118, 120, 122, 124, 126 and the compute device 102. The tunnel 128, 130, 132 is an encrypted communications link between the compute device 102 and an outside network (the network hosting the nodes 118, 120, 122, 124, 126). The IP address of the outside network is then used on communications from the compute device 102 to the internet as those communications go through the tunnel 128, 130, 132. The tunnel 128, 130, 132 can implement a VPN tunneling protocol, such as Layer 2 Tunneling Protocol (L2TP), IPSec, Secure Socket Tunneling Protocol (SSTP), OpenVPN, a combination thereof, or the like.

The system 100, by including the DNS 104 to resolve to a VPN server (e.g., the node 118, 120, 122, 124, 126, provides a dynamic multi-tenant service where the compute device 102 can use a single source IP address to create multiple VPN tunnels 128, 130, 132 as needed. This is achieved by a VPN service 134 exposing, via the DNS 104, multiple domain names (e.g., domain names 112, 114, 116, etc.) to the compute device 102. The compute device 102 creates different VPN tunnels 128, 130, 132 to each domain name. Each domain name can be guaranteed to return a different IP address.

The service 134 can include a service with nodes spread across geographies. The service 134 can be state-wide, nation-wide, continent-wide, global, or the like. The service 134, through the DNS 104, exposes multiple domain names (e.g., domain names 112, 114, 116 . . . ). The compute device 102 creates multiple tunnels 128, 130, 132, one to each of the domain names in the example of FIG. 1. The node 118, 120, 122, 124, 126 that services the traffic for the tunnel 128, 130, 132 can be selected, by the DNS 104. The selection can be random or based on a heuristic. The heuristic can be based on a response time of the node 118, 120, 122, 124, 126, traffic load on the node 118, 120, 122, 124, 126, or the like. The IP address of the node 118, 120, 122, 124, 126 can be provided to the compute device 102 by a control plane service. The tunnels 128, 130, 132 can be uniformly distributed across domains.

Each of the domain names can resolve to disjoint groups 106, 108, 110 of nodes 118, 120, 122, 124, 126. Each of the groups 106, 108, 110 can be situated in a different, geographically distributed. Each node 118, 120, 122, 124, 126 has a different instance level IP address. The DNS 104 thus maps each domain name to one the nodes 118, 120, 122, 124, 126 in the group 106, 108, 110. The DNS 104 resolving the domain name to a unique (source IP, destination IP) pair guarantees that each domain name will resolve to a different IP. This guarantees that the compute device 102 and the node 118, 120, 122, 124, 126 create a unique <source, destination>IP pair.

The nodes 118, 120, 122, 124, 126 are organized into groups 106, 108, 110. The groups 106, 108, 110 can include nodes 118, 120, 122, 124, 126 that are to be updated at about a same time. The nodes 118, 120, 122, 124, 126 of different groups can be guaranteed to be updated at different times, such that an entire update process is performed on the group 106 before the update process begins on any of the nodes of any of the remaining groups 108, 110. The updates of the nodes 118, 120, 122, 124, 126 can occur concurrently such that all nodes of the group 106 are updated at about the same time. The groups 106, 108, 110 can be updated sequentially, such that all nodes of the group 106 are updated first, then, after the update of the group 106 is performed, the nodes of the group 108 can be updated, and so on. Such grouping and maintenance of nodes in the groups 106, 108, 110 helps ensure that only a single group 106, 108, 110 of the nodes 118, 120, 122, 124, 126 is unavailable for planned maintenance at a given time. Ultimately, such a configuration helps a VPN operator ensure service level agreement (SLA) performance parameters (e.g., uptime, bandwidth, etc.) of a VPN.

The tenant associated with the compute device 102 can subscribe to more tunnels 128, 130, 132 than they might otherwise subscribe to, such as for bandwidth requirements. The tunnels 128, 130, 132 are accessible through the domain names 112, 114, 116. This sort of subscription is called an "oversubscription". By making such an oversubscription, the tenant can be assured to meet their bandwidth requirements even when a single group 106, 108, 110 to which the tenant subscribed is undergoing an update or other maintenance. For example, if the tenant wants 1 Gigabits per second (Gbps) bandwidth, and each tunnel provides 250 Megabits per second (Mbps), the tenant can create 5 tunnels instead of 4 tunnels to guarantee the bandwidth even while maintenance is performed on a group 106, 108, 110.

The DNS 104 can monitor performance of each of the nodes 118, 120, 122, 124, 126. The performance can include latency, health, capacity, a combination thereof, or the like. The DNS 104 can return the IP address of the node 118, 120, 122, 124, 126 that has sufficient performance and is closest to the compute device 102. Sufficient performance means that one or more of the latency, health, capacity, or some combination thereof satisfies a specified criterion. Latency can mean a time for the DNS 104 to receive a response from the node 118, 120, 122, 124, 126 or a round trip time (RTT) for communications between the compute device 102 and the node 118, 120, 122, 124, 126. Capacity means an amount of communication bandwidth remaining after accounting for all tunnels currently being served by the node 118, 120, 122, 124, 126. Health indicates whether there are any known warnings or errors, such as "offline", "OK", "Warning", "Error", "Transitional", "Unapproved", or the like, that have been logged by the node 118, 120, 122, 124, 126. If the node 118, 120, 122, 124, 126 has a health value of "Error", the node will not be able to satisfy tunnel 128, 130, 132 traffic.

The node 126, in the example of FIG. 1 has failed. The DNS 104, in performing the health check of the node 126, has determined that the node 126 is not available for attending to traffic over a tunnel 128, 130, 132 and has refrained from assigning the node 126 to handle traffic over the tunnel 128, 130, 132. Any health indicator besides "OK" can indicate that the node 126 is not available to handle traffic through the tunnel 128, 130, 132. Responsive to determining the node 118, 120, 122, 124, 126 is not available to service traffic across the tunnel 128, 130, 132, the DNS 104 can route traffic to the same domain name that mapped to the node 118, 120, 122, 124, 126 to a different IP address of a node in the same group as the failed node. In the example of FIG. 1, the DNS 104 has routed the traffic through the tunnel 132 to the node 122 responsive to determining the node 126 is not available to handle the traffic through the tunnel 132. The DNS 104 can provide an IP address to the compute device 102 that corresponds to a different node in the same group as the node that failed.

The node 124, in the example of FIG. 1 is servicing compute devices traffic such that it no longer has sufficient bandwidth to service traffic from another node. The DNS 104, in performing the health check of the node 126, has determined that the node 126 no longer has sufficient capacity for attending to traffic over the tunnel 128 and has refrained from assigning the node 124 to handle traffic over the tunnel 128. Any capacity value less than the SLA associated with a given tunnel can indicate that the node 124 is not available to handle traffic through the tunnel 128. Responsive to determining the node 124 is not available to service traffic across the tunnel 128 the DNS 104 can route traffic to the same domain name that mapped to the node 124 to a different IP address of a node in the same group as the node 124 with insufficient capacity. In the example of FIG. 1, the DNS 104 has routed the traffic through the tunnel 128 to the node 118 responsive to determining the node 124 has insufficient capacity available to handle the traffic through the tunnel 128. The DNS 104 can provide an IP address to the compute device 102 that corresponds to a different node in the same group as the node that has insufficient capacity.

To determine if a given node 118, 120, 122, 124, 126 has sufficient health or capacity, the DNS 104 can transmit a monitor packet to the node 118, 120, 122, 124, 126. The node 118, 120, 122, 124, 126 can respond with an acknowledge (ACK) packet to indicate it is available, healthy, has capacity, or a combination thereof. The node 118, 120, 122, 124, 126 can either not respond or respond with a negative ACK (NACK) packet to indicate is it not available, not healthy, does not have capacity or a combination thereof. The DNS 104, responsive to an ACK packet from the node 118, 120, 122, 124, 126 can assign traffic to the node 118, 120, 122, 124, 126. The DNS 104, responsive to the NACK packet from the node 118, 120, 122, 124, 126 can refrain from assigning traffic to the node 118, 120, 122, 124, 126.

Figure 2:
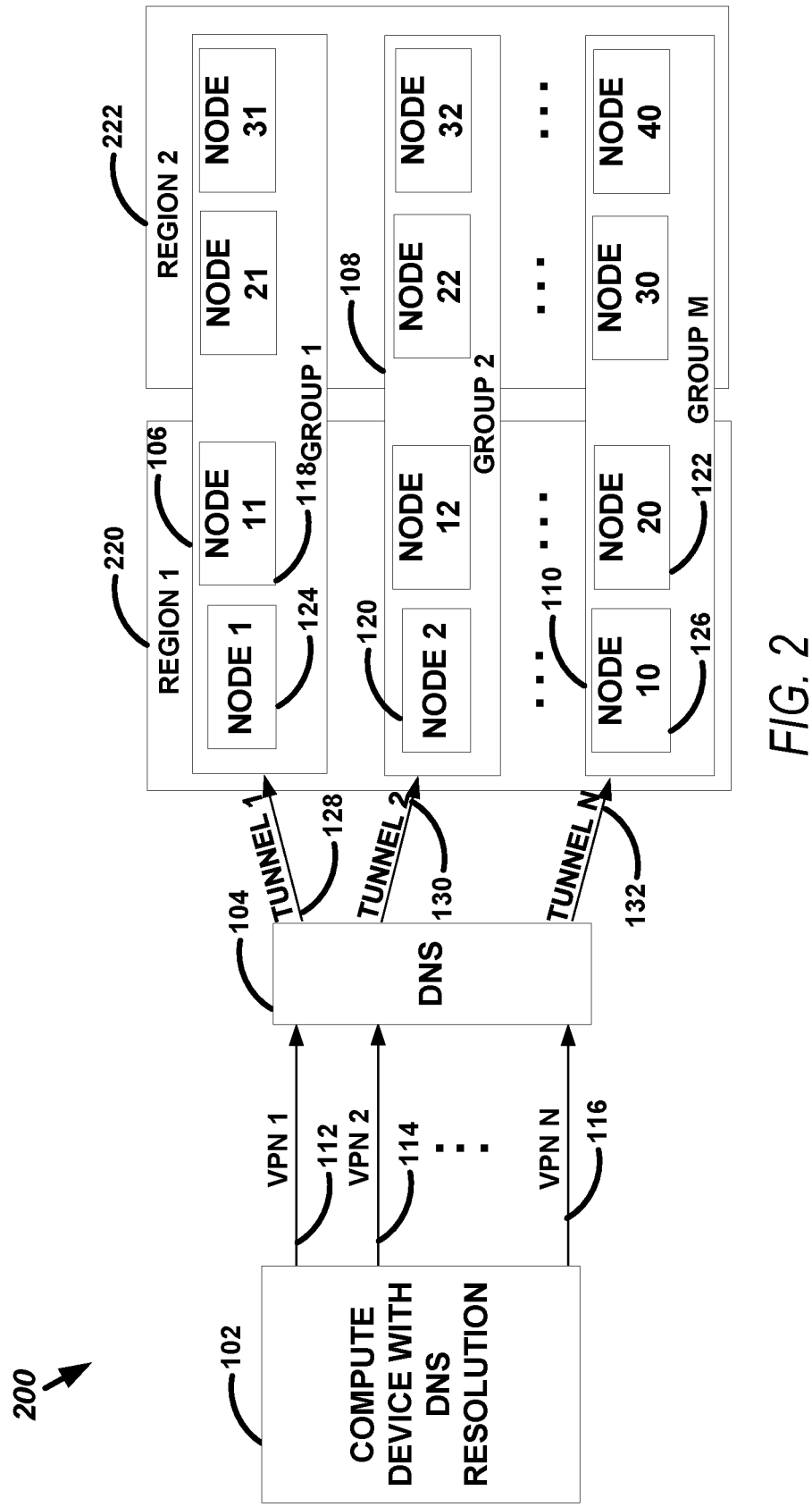
FIG. 2 illustrates, by way of example, a block diagram of an embodiment of a geographically distributed VPN service.

FIG. 2 illustrates, by way of example, a block diagram of an embodiment of a geographically distributed VPN system 200. The system 200 is similar to the service 200 with the nodes 118, 120, 122, 124, 126 distributed across multiple, distinct, geographical regions 220, 222. The DNS 104 can receive a domain name 112, 114, 116 from the compute device 102. The DNS 104, in resolving the domain name 112, 114, 116 can select multiple nodes of a given group 106, 108, 110 to which the domain name 112, 114, 116 is to be mapped. The multiple nodes can be in respective different regions 220, 222. The DNS 104 can identify which of the regions 220, 222 is geographically closest to the compute device 102. The geographically closest region 220, 222 can be identified by determining a response time of the nodes in the group 106, 108, 110 and selecting the smallest response time as the region 220, 222 that is closest to the compute device 102.

FIG. 3 illustrates, by way of example, a diagram of an embodiment of a DNS memory 300 to support VPN as a service. The DNS memory 300 as illustrated includes columns of data. Data in a same row, different column are related to a specific node 118, 120, 122, 124, 126. The columns of data in the memory 300 include domain name entries 330, IP address entries 332, health entries 334, capacity entries 336, and region entries 338. Note that not all columns of data are required. For example, if the DNS 104 that includes the DNS memory 300 does not perform a health check, the health entries 334 can be removed from the memory 300. If the nodes 118, 120, 122, 124, 126 are not geographically distributed, the region entries 338 can be removed from the memory 300. Other variations are possible and within the scope of embodiments.

The domain name entries 330 stored the domain name that resolve to the IP address in the IP address entry 332 associated with the node 118, 120, 122, 124, 126. The health entries 334 record the health status (e.g., error, warning, online/offline, or the like) of the node 118, 120, 122, 124, 126. The capacity entries 336 indicate how much more bandwidth the node 118, 120, 122, 124, 126 can service, how many devices are being serviced by the node 118, 120, 122, 124, 126, or other data indicating how much more traffic can be routed to the node 118, 120, 122, 124, 126 by the DNS 104. The region entries 338 indicate the geographic region in which the node 118, 120, 122, 124, 126 is situated.

Figure 4:
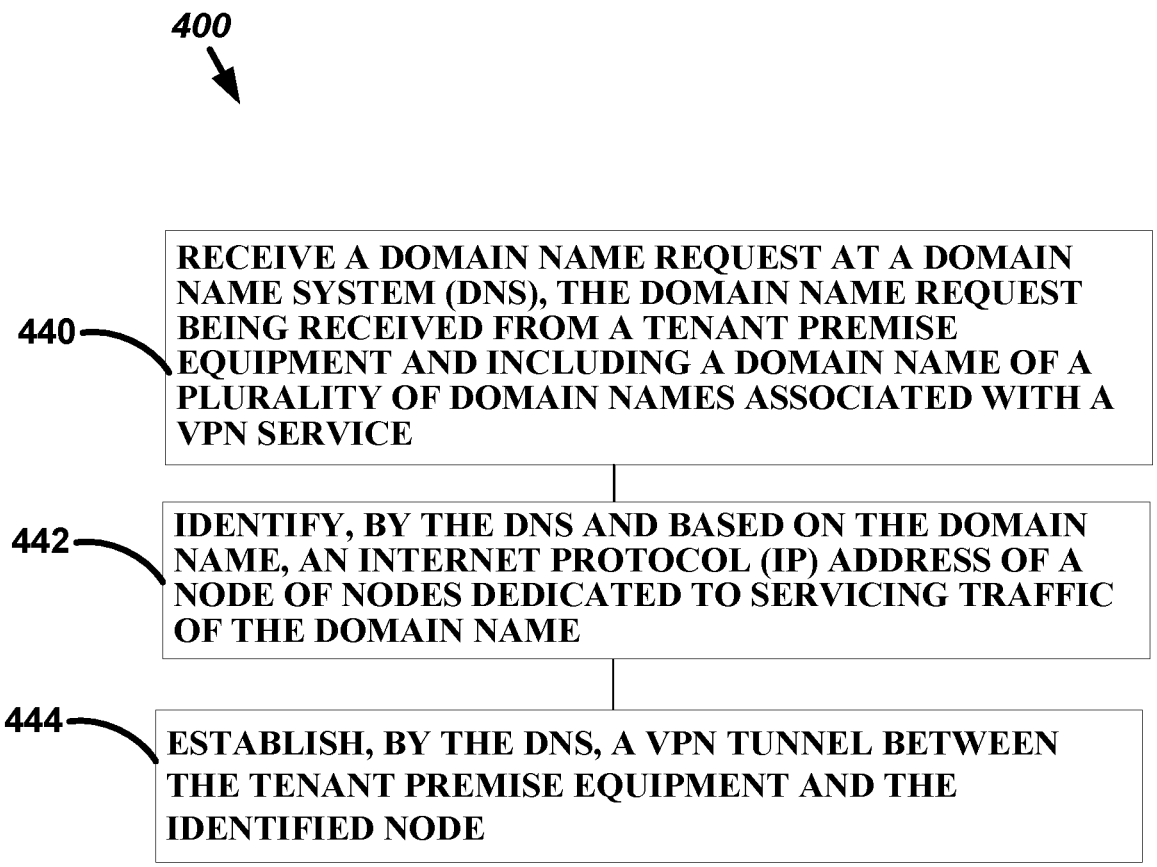
FIG. 4 illustrates, by way of example, a diagram of an embodiment of a method for peer-to-service VPN provision.

FIG. 4 illustrates, by way of example, a diagram of an embodiment of a method 400 for virtual private network (VPN) as a service. The method 400 as illustrated includes receiving a domain name request at a domain name system (DNS), the domain name request being received from a tenant premise equipment and including a domain name of a plurality of domain names associated with a VPN service, at operation 440; identifying, by the DNS and based on the domain name, an Internet Protocol (IP) address of a node of nodes dedicated to servicing traffic of the domain name, at operation 442; and establishing, by the DNS, a VPN tunnel between the tenant premise equipment and the identified node, at operation 444.

The method 400 can further include, wherein the nodes are a subset of a plurality of nodes, the plurality of nodes organized into groups of nodes dedicated to servicing traffic of a respective domain name of the plurality of domain names. The method 400 can further include scheduling maintenance of the plurality of nodes such that groups of nodes are sequentially scheduled for maintenance. Scheduling maintenance can include scheduling such that only a single group undergoes maintenance at a given time.

The groups can include nodes in multiple geographically separated regions. The method 400 can further include determining which of the geographically separated regions is closest to the tenant premise equipment. Identifying the node can include selecting a node of the plurality of nodes assigned to the group and in the region geographically closest to the tenant premise equipment.

Figure 5:
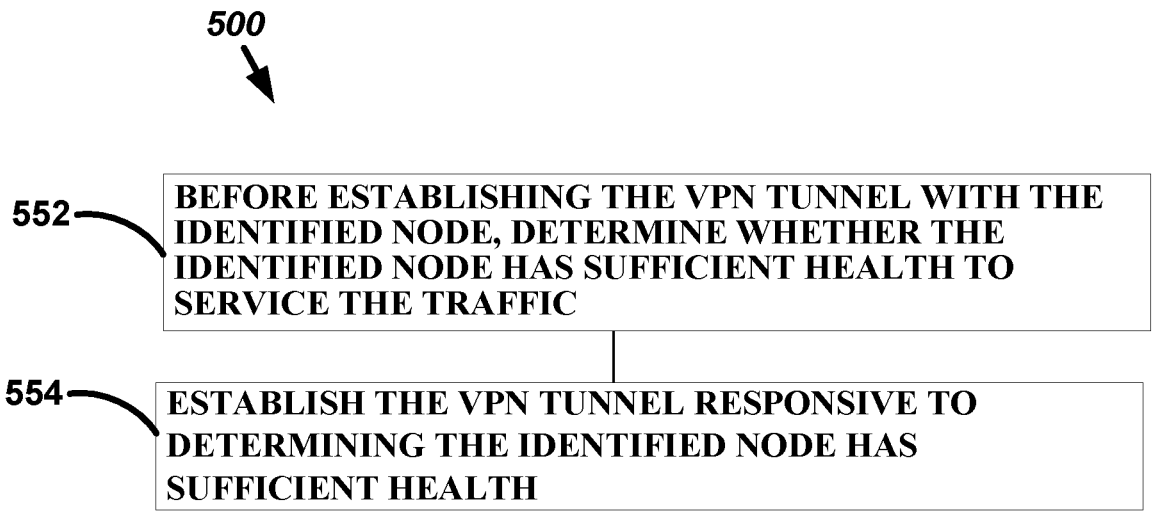
FIG. 5 illustrates, by way of example, a diagram of an embodiment of a method 500 for ensuring a robust VPN tunnel.

FIG. 5 illustrates, by way of example, a diagram of an embodiment of a method 500 for ensuring a robust VPN tunnel. The method 500 as illustrated includes before establishing the VPN tunnel with the identified node (at operation 444), determining whether the identified node has sufficient health to service the traffic, at operation 552; and establishing the VPN tunnel responsive to determining the identified node has sufficient health, at operation 554. The operation 552 can further include issuing a monitor packet to the node and receiving an acknowledgment packet, a negative acknowledgment, or no response to the monitor packet. The method 500 can further include determining the node has sufficient health responsive to the acknowledgement packet and determining the node has insufficient health otherwise.

Figure 6:
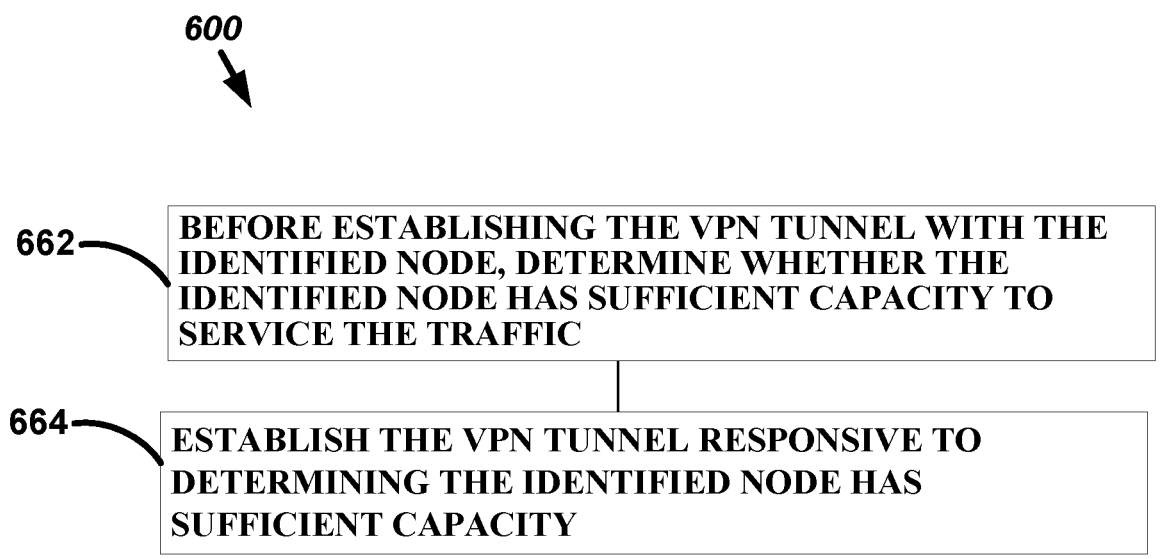
FIG. 6 illustrates, by way of example, a diagram of an embodiment of another method for ensuring a robust VPN tunnel.

FIG. 6 illustrates, by way of example, a diagram of an embodiment of another method 600 for ensuring a robust VPN tunnel. The method 600 as illustrated includes, before establishing the VPN tunnel with the identified node, determining whether the identified node has sufficient capacity to service the traffic, at operation 662; and establishing the VPN tunnel responsive to determining the identified node has sufficient capacity, at operation 664. The operation 662 can include issuing a monitor packet to the node and receiving an acknowledgment packet, a negative acknowledgment, or no response to the monitor packet. The method 600 can further include determining the node has sufficient capacity responsive to the acknowledgement packet and determining the node has insufficient capacity otherwise.

Figure 7:
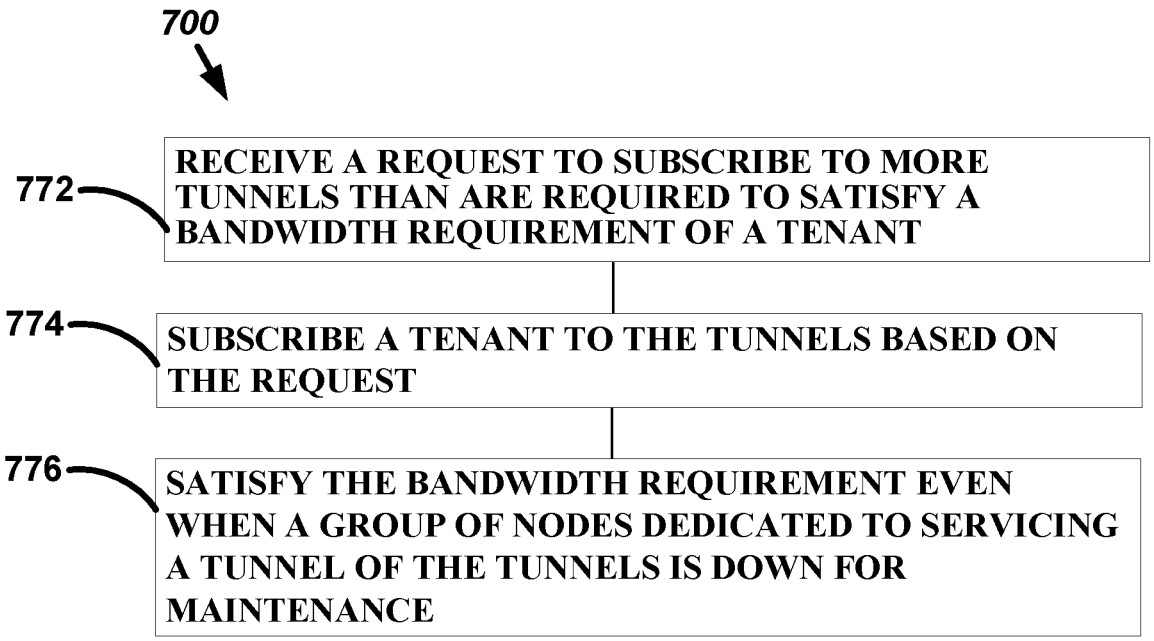
FIG. 7 illustrates, by way of example, a diagram of an embodiment of another method for ensuring availability of a VPN tunnel with sufficient bandwidth.

FIG. 7 illustrates, by way of example, a diagram of an embodiment of another method 700 for ensuring availability of a VPN tunnel with sufficient bandwidth. The method 700 as illustrated includes receiving a request to subscribe to more tunnels than are required to satisfy a bandwidth requirement of a tenant, at operation 772; subscribing a tenant to the tunnels based on the request, at operation 774; and satisfying the bandwidth requirement even when a group of nodes dedicated to servicing a tunnel of the tunnels is down for maintenance, at operation 776.

Figure 8:
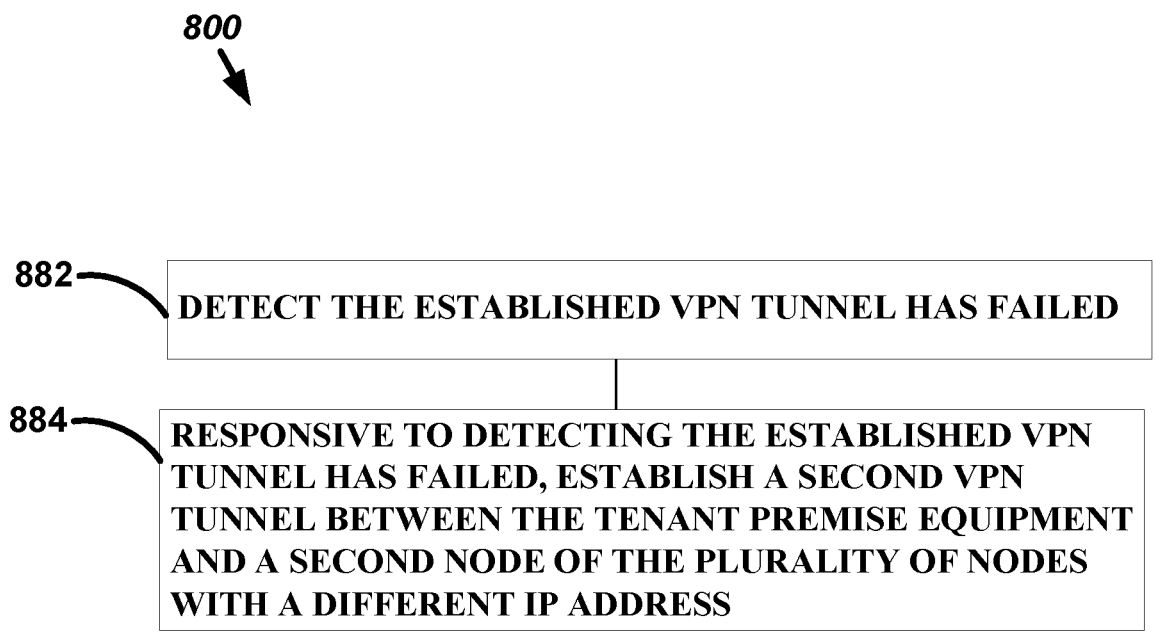
FIG. 8 illustrates, by way of example, a diagram of an embodiment of another method for VPN tunnel handover.

FIG. 8 illustrates, by way of example, a diagram of an embodiment of another method 800 for VPN tunnel handover. The method 800 as illustrated includes detecting the established VPN tunnel has failed, at operation 882; and responsive to detecting the established VPN tunnel has failed, establishing a second VPN tunnel between the tenant premise equipment (e.g., CPE) and a second node of the plurality of nodes with a different IP address, at operation 884.

Embodiments provide a single VPN service that is globally scalable while still providing low latency and ensuring bandwidth. VPN service is typically a router-to-router connectivity. Instead of the tenant having an IP address which ties them to a single VPN instance, embodiments expose a VPN by domain name. Using the domain name and grouping nodes 118, 120, 122, 124, 126 helps insulate from availability and latency issues realized from a VPN exposed an IP address. If a node 118, 120, 122, 124, 126 goes down using embodiments, if the node 118, 120, 122, 124, 126 goes down a simple fresh DNS resolution can reestablish the VPN tunnel with a different node 118, 120, 122, 124, 126 in the same group. This runs the VPN as a service which is an end-to-end service but behind a domain name (e.g., a fully qualified domain name (FQDN)). This is different from traditional VPN tunnels that are IP address-to-IP address type of connectivity. Instead, it is an IP address to service communication for a VPN. Instead of connecting to an IP address to generate the tunnel the compute device 102 connects to a service through the domain name.

Figure 9:
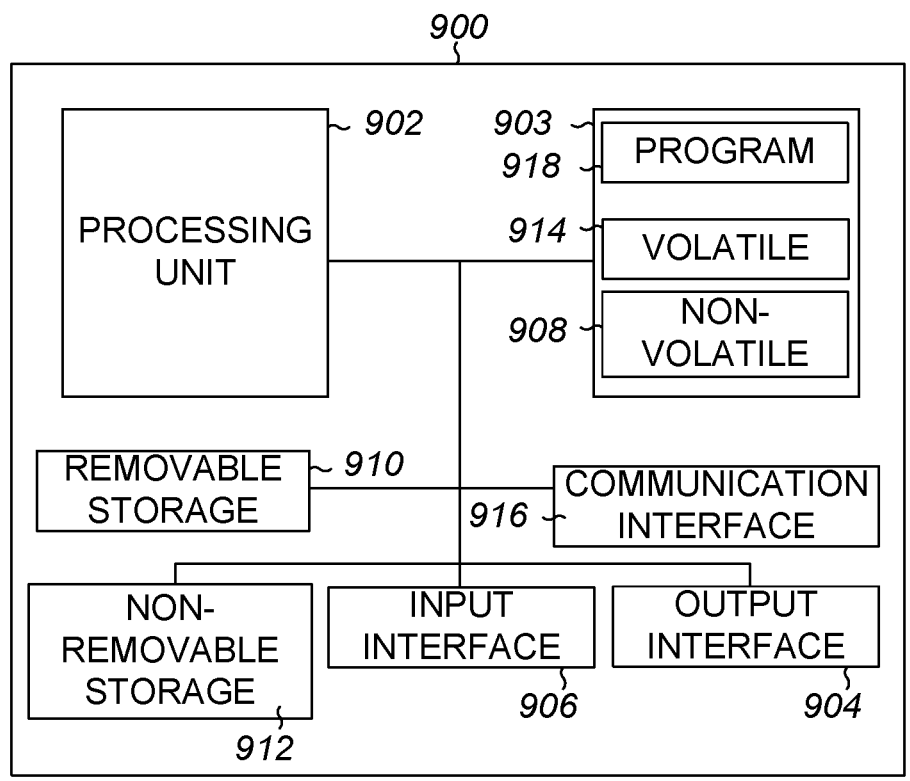
FIG. 9 illustrates, by way of example, a block diagram of an embodiment of a machine (e.g., a computer system) to implement one or more embodiments.

FIG. 9 illustrates, by way of example, a block diagram of an embodiment of a machine 900 (e.g., a computer system) to implement one or more embodiments. One or more of the compute device 102, DNS 104, node 118, 120, 122, 124, 126, method 400, method 500, method 600, method 700, method 800, or a component or operations thereof can be implemented, at least in part, using a component of the machine 900. One example machine 900 (in the form of a computer), may include a processing unit 902, memory 903, removable storage 910, and non-removable storage 912. Although the example computing device is illustrated and described as machine 900, the computing device may be in different forms in different embodiments. For example, the computing device may instead be a smartphone, a tablet, smartwatch, or other computing device including the same or similar elements as illustrated and described regarding FIG. 9. Devices such as smartphones, tablets, and smartwatches are generally collectively referred to as mobile devices. Further, although the various data storage elements are illustrated as part of the machine 900, the storage may also or alternatively include cloud-based storage accessible via a network, such as the Internet.

Memory 903 may include volatile memory 914 and non-volatile memory 908. The machine 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 900 may include or have access to a computing environment that includes input 906, output 904, and a communication connection 916. Output 904 may include a display device, such as a touchscreen, that also may serve as an input component. The input 906 may include one or more of a touchscreen, touchpad, mouse, keyboard, camera, one or more device-specific buttons, one or more sensors integrated within or coupled via wired or wireless data connections to the machine 900, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 902 (sometimes called processing circuitry) of the machine 900. A hard drive, CD-ROM, and RAM are some examples of articles including a non-transitory computer-readable medium such as a storage device. For example, a computer program 918 may be used to cause processing unit 902 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Additional Notes and Examples

Example 1 includes a method for virtual private network (VPN) as a service, the method comprising receiving a domain name request at a domain name system (DNS), the domain name request being received from a tenant premise equipment and including a domain name of a plurality of domain names associated with a VPN service, identifying, by the DNS and based on the domain name, an Internet Protocol (IP) address of a node of nodes dedicated to servicing traffic of the domain name, and establishing, by the DNS, a VPN tunnel between the tenant premise equipment and the identified node.

In Example 2, Example 1 further includes, wherein the nodes are a subset of a plurality of nodes, the plurality of nodes organized into groups of nodes dedicated to servicing traffic of a respective domain name of the plurality of domain names, the method further comprising scheduling maintenance of the plurality of nodes such that groups of nodes are sequentially scheduled for maintenance.

In Example 3, Example 2 further includes, wherein scheduling maintenance includes scheduling such that only a single group undergoes maintenance at a given time.

In Example 4 at least one of Examples 2-3 further includes, wherein the groups include nodes in multiple geographically separated regions and the method further comprises determining which of the geographically separated regions is closest to the tenant premise equipment, and wherein identifying the node includes selecting a node of the plurality of nodes assigned to the group and in the region geographically closest to the tenant premise equipment.

In Example 5, at least one of Examples 1-4 further includes before establishing the VPN tunnel with the identified node, determining whether the identified node has sufficient health to service the traffic, and establishing the VPN tunnel responsive to determining the identified node has sufficient health.

In Example 6, Example 5 further includes, wherein determining whether the identified node has sufficient health includes issuing a monitor packet to the node and receiving an acknowledgment packet, a negative acknowledgment, or no response to the monitor packet, and determining the node has sufficient health responsive to the acknowledgement packet and determining the node has insufficient health otherwise.

In Example 7, at least one of Examples 1-6 further includes before establishing the VPN tunnel with the identified node, determining whether the identified node has sufficient capacity to service the traffic, and establishing the VPN tunnel responsive to determining the identified node has sufficient capacity.

In Example 8, Example 7 further includes, wherein determining whether the identified node has sufficient capacity includes issuing a monitor packet to the node and receiving an acknowledgment packet, a negative acknowledgment, or no response to the monitor packet, and determining the node has sufficient capacity responsive to the acknowledgement packet and determining the node has insufficient capacity otherwise.

In Example 9, at least one of Examples 1-8 further includes receiving a request to subscribe to more tunnels than are required to satisfy a bandwidth requirement of a tenant, subscribing a tenant to the tunnels based on the request, and satisfying the bandwidth requirement even when a group of nodes dedicated to servicing a tunnel of the tunnels is down for maintenance.

In Example 10, at least one of Examples 1-9 further includes detecting the established VPN tunnel has failed, and responsive to detecting the established VPN tunnel has failed, establishing a second VPN tunnel between the tenant premise equipment and a second node of the plurality of nodes with a different IP address.

Example 11 includes a machine-readable medium including instructions that, when executed by a machine, cause the machine to perform the method of at least one of Examples 1-10.

Example 12 includes processing circuitry and a memory coupled to the processing circuitry, the memory including instructions that, when executed by a machine, cause the machine to perform the method of at least one of Examples 1-10.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A method for virtual private network (VPN) as a service, the method comprising:
   receiving a domain name request at a domain name system (DNS), the domain name request being received from a tenant premise equipment and including a domain name of a plurality of domain names associated with a VPN service;
   identifying, by the DNS and based on the domain name, an Internet Protocol (IP) address of a node of nodes dedicated to servicing traffic of the domain name; and
   establishing, by the DNS, a VPN tunnel between the tenant premise equipment and the identified node.

2. The method of claim 1, wherein the nodes are a subset of a plurality of nodes, the plurality of nodes organized into groups of nodes dedicated to servicing traffic of a respective domain name of the plurality of domain names, the method further comprising scheduling maintenance of the plurality of nodes such that groups of nodes are sequentially scheduled for maintenance.

3. The method of claim 2, wherein scheduling maintenance includes scheduling such that only a single group undergoes maintenance at a given time.

4. The method of claim 2, wherein the groups include nodes in multiple geographically separated regions and the method further comprises:
   determining which of the geographically separated regions is closest to the tenant premise equipment; and
   wherein identifying the node includes selecting a node of the plurality of nodes assigned to the group and in the region geographically closest to the tenant premise equipment.

5. The method of claim 1, further comprising:
   before establishing the VPN tunnel with the identified node, determining whether the identified node has sufficient health to service the traffic; and
   establishing the VPN tunnel responsive to determining the identified node has sufficient health.

6. The method of claim 5, wherein:
   determining whether the identified node has sufficient health includes issuing a monitor packet to the node and receiving an acknowledgment packet, a negative acknowledgment, or no response to the monitor packet; and
   determining the node has sufficient health responsive to the acknowledgement packet and determining the node has insufficient health otherwise.

7. The method of claim 1, further comprising:
   before establishing the VPN tunnel with the identified node, determining whether the identified node has sufficient capacity to service the traffic; and
   establishing the VPN tunnel responsive to determining the identified node has sufficient capacity.

8. The method of claim 7, wherein:
   determining whether the identified node has sufficient capacity includes issuing a monitor packet to the node and receiving an acknowledgment packet, a negative acknowledgment, or no response to the monitor packet; and
   determining the node has sufficient capacity responsive to the acknowledgement packet and determining the node has insufficient capacity otherwise.

9. The method of claim 1, further comprising:
   receiving a request to subscribe to more tunnels than are required to satisfy a bandwidth requirement of a tenant;
   subscribing a tenant to the tunnels based on the request; and
   satisfying the bandwidth requirement even when a group of nodes dedicated to servicing a tunnel of the tunnels is down for maintenance.

10. The method of claim 1, further comprising:
    detecting the established VPN tunnel has failed; and responsive to detecting the established VPN tunnel has failed, establishing a second VPN tunnel between the tenant premise equipment and a second node of the plurality of nodes with a different IP address.

11. A machine-readable medium including instructions that, when executed by a machine, cause a domain name system (DNS) to perform operations for virtual private network (VPN) as a service, the operations comprising:
receiving a domain name request, the domain name request being received from a tenant premise equipment and including a domain name of a plurality of domain names associated with a VPN service;
identifying, based on the domain name, an Internet Protocol (IP) address of a node of nodes dedicated to servicing traffic of the domain name; and
establishing a VPN tunnel between the tenant premise equipment and the identified node.

12. The machine-readable medium of claim 11, wherein the nodes are a subset of a plurality of nodes, the plurality of nodes organized into groups of nodes dedicated to servicing traffic of a respective domain name of the plurality of domain names, the operations further comprise scheduling maintenance of the plurality of nodes such that groups of nodes are sequentially scheduled for maintenance.

13. The machine-readable medium of claim 12, wherein scheduling maintenance includes scheduling such that only a single group undergoes maintenance at a given time.

14. The machine-readable medium of claim 12, wherein the groups include nodes in multiple geographically separated regions and the operations further comprise:
determining which of the geographically separated regions is closest to the tenant premise equipment; and
wherein identifying the node includes selecting a node of the plurality of nodes assigned to the group and in the region geographically closest to the tenant premise equipment.

15. The machine-readable medium of claim 11, wherein the operations further comprise:
before establishing the VPN tunnel with the identified node, determining whether the identified node has sufficient health to service the traffic; and
establishing the VPN tunnel responsive to determining the identified node has sufficient health.

16. The machine-readable medium of claim 15, wherein:
determining whether the identified node has sufficient health includes issuing a monitor packet to the node and receiving an acknowledgment packet, a negative acknowledgment, or no response to the monitor packet; and
determining the node has sufficient health responsive to the acknowledgement packet and determining the node has insufficient health otherwise.

17. A domain name system (DNS) comprising:
processing circuitry;
a memory coupled to the processing circuitry, the memory including instructions that, when executed by the processing circuitry, cause the processing circuitry to perform operations for virtual private network (VPN) as a service, the operations comprising:
receiving a domain name request, the domain name request being received from a tenant premise equipment and including a domain name of a plurality of domain names associated with a VPN service;
identifying, based on the domain name, an Internet Protocol (IP) address of a node of nodes dedicated to servicing traffic of the domain name; and
establishing a VPN tunnel between the tenant premise equipment and the identified node.

18. The DNS of claim 17, wherein the operations further comprise:
before establishing the VPN tunnel with the identified node, determining whether the identified node has sufficient capacity to service the traffic; and
establishing the VPN tunnel responsive to determining the identified node has sufficient capacity.

19. The DNS of claim 18, wherein:
determining whether the identified node has sufficient capacity includes issuing a monitor packet to the node and receiving an acknowledgment packet, a negative acknowledgment, or no response to the monitor packet; and
determining the node has sufficient capacity responsive to the acknowledgement packet and determining the node has insufficient capacity otherwise.

20. The DNS of claim 17, wherein the operations further comprise:
receiving a request to subscribe to more tunnels than are required to satisfy a bandwidth requirement of a tenant;
subscribing a tenant to the tunnels based on the request; and
satisfying the bandwidth requirement even when a group of nodes dedicated to servicing a tunnel of the tunnels is down for maintenance.

\* \* \* \* \*